UNITED STATES PATENT OFFICE.

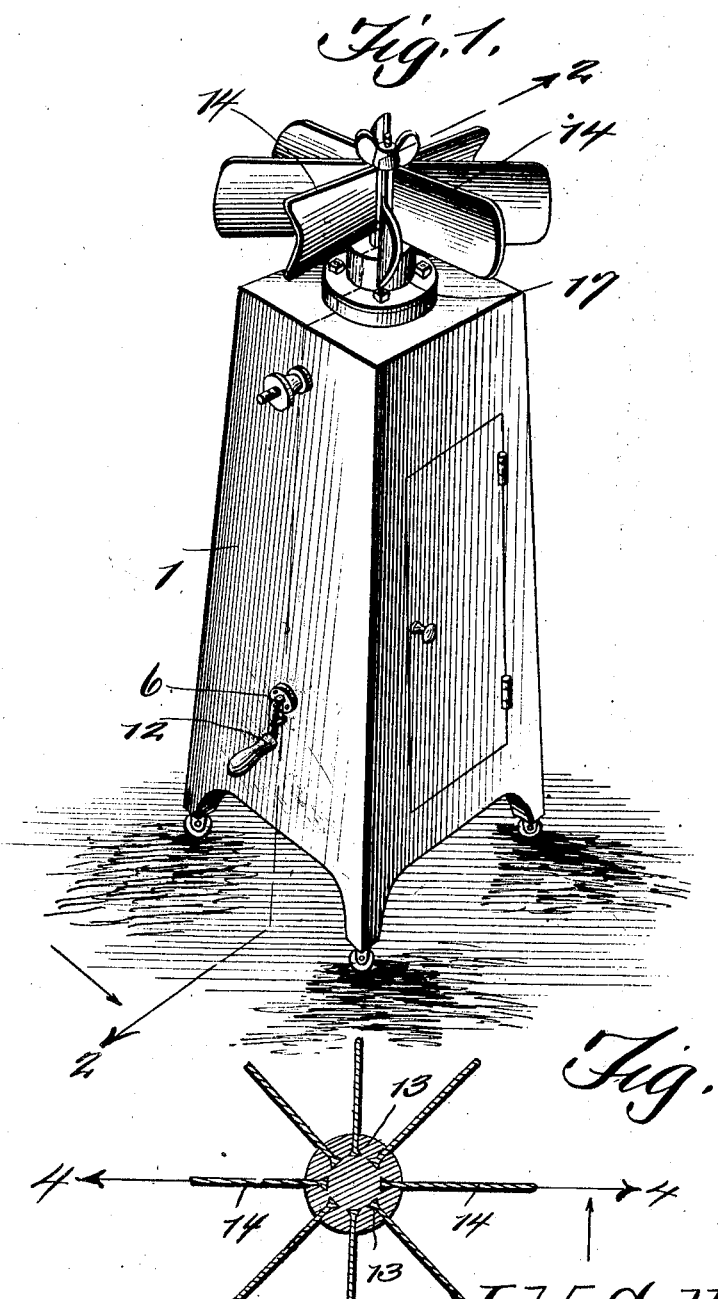

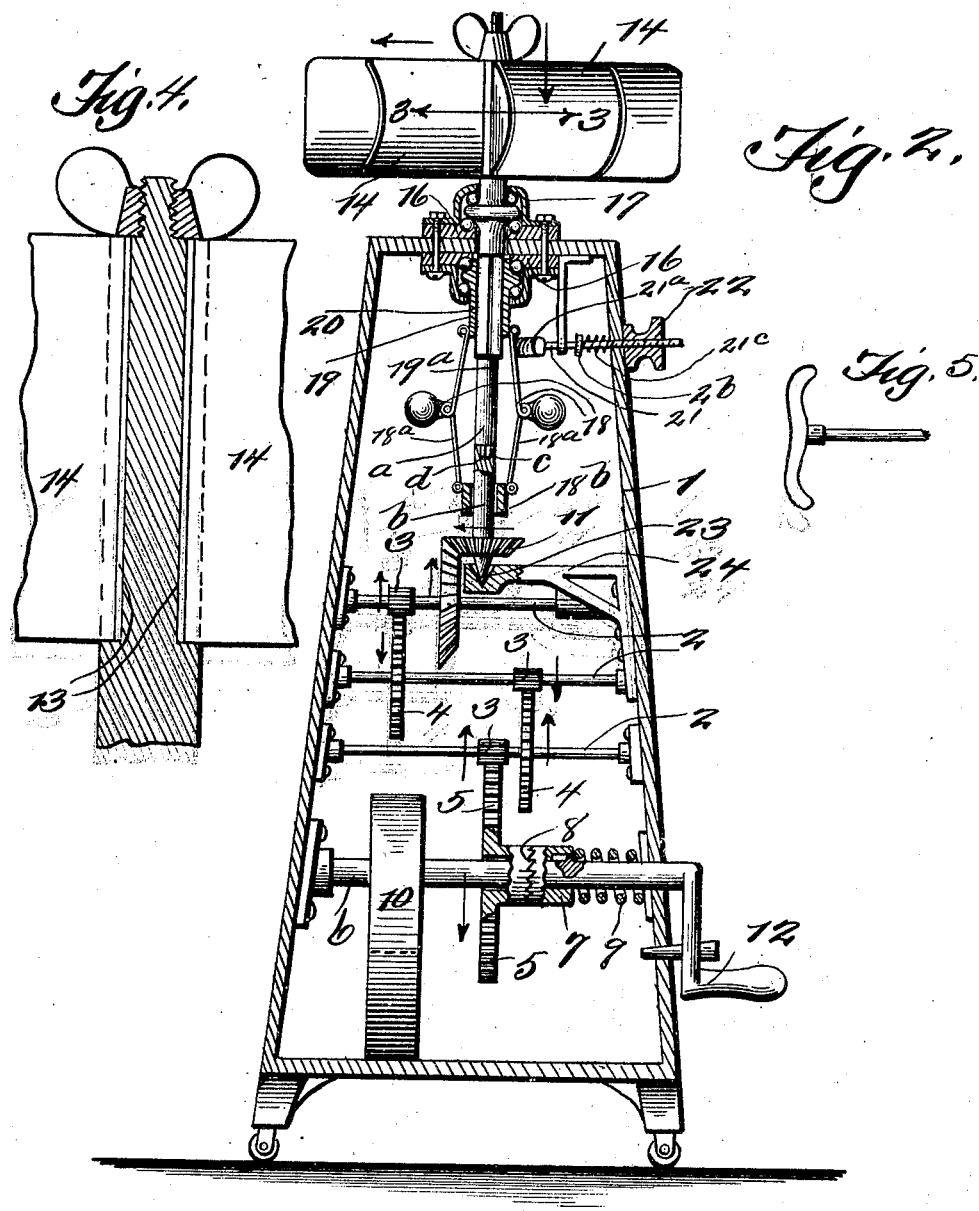

JOSHUA H. GALLAND, OF FLORENCE, COLORADO, ASSIGNOR OF ONE-HALF TO SIMON P. SMITH, OF FLORENCE, COLORADO.

FAN.

959,503.  Specification of Letters Patent.  Patented May 31, 1910.

Application filed April 24, 1907. Serial No. 369,940.

*To all whom it may concern:*

Be it known that I, JOSHUA H. GALLAND, citizen of the United States, residing at Florence, in the county of Fremont and State of Colorado, have invented certain new and useful Improvements in Fans, of which the following is a specification, reference being had therein to the accompanying drawing.

This invention pertains to a new and useful fan, designed especially to be operated by a spring motor, so as to allow the fan to be conveniently moved from one place to another; furthermore, the invention sets forth, as an essential object to provide a device of this particular character, which is simple and inexpensive to manufacture and very effective in practical use.

A further object is to provide a fan carrying shaft, which may be removed, without disturbing the governor which will be left depending from the inside of the casing, which supports the fan proper, as will be clearly depicted in the drawings.

This invention comprises further objects and combinations of elements which will be hereinafter more fully described, shown in the accompanying drawings, and the novel features thereof will be pointed out by the appended claim.

To obtain a full and correct understanding of the details of construction, combinations of features, elements and advantages, reference is to be had to the hereinafter set forth description and the accompanying drawings in connection therewith, wherein, Figure 1 illustrates a perspective view of the fan, showing the same carried by a pedestal-cabinet, which is tapering toward its upper end. Fig. 2 is a sectional view on line 2—2 of Fig. 1, showing a particular journal for the fan-carrying shaft. Fig. 3 is a sectional view on line 3—3 of Fig. 2. Fig. 4 is a sectional view on line 4—4 of Fig. 3. Fig. 5 is a plan view of the brake shoe.

Making renewed reference to the accompanying drawings, wherein similar reference characters indicate corresponding parts in the several illustrations, by figures, 1 designates a suitable cabinet of any desired form, but in the present application, the applicant prefers a cabinet which is tapering toward its upper end. In this cabinet, is journaled a plurality of shafts 2, upon each one of which, is journaled, a pinion 3 and a spur gear 4, which forms a chain of gears, suitable for transmitting motion from the clutch controlled gear 5, loosely journaled upon the shaft 6, which is journaled in the lower portion of the cabinet, as clearly shown.

Splined to the shaft 6, is a clutch member 7, which is designed to engage the clutch teeth 8, formed with the gear 5; a coil spring is mounted upon the shaft 6 and disposed between the clutch member 7 and the side of the cabinet. When the shaft 6 is rotated in one direction, the winding of the spring is caused, but when the said shaft is rotated in the opposite direction by the unwinding of the spring 10, the gears are operated, which will cause motion to be transmitted to the fan-carrying shaft, through the medium of the bevel pinion 11, carried at the lower end of said fan-carrying shaft. This fan-carrying shaft 19ª, is composed of two sections $a$ and $b$, which are caused to rotate together by means of a rectangular lug and recess $c$ and $d$, so as to transmit motion to the upper section of the shaft and to the fan, as will be clearly evident from examination of Fig. 2 of the drawings. By constructing the shaft in two sections, the upper portion may be removed without disturbing the lower section. The shaft 6, is provided with a crank handle 12 for the purpose of winding the spring 10. The upper end of the fan carrying shaft is provided with a plurality of vertically disposed recesses 13, which receive the bevel enlargements formed with the fan blades, 14, as shown. To prevent the fan blades from displacement vertically, a winged nut is provided, which is threaded upon the upper end of said shaft. The upper portion of the cabinet through which the fan carrying shaft passes, is provided with an upper and lower ball bearing journal box 16, the securing plate 17, of the upper one, may be removed, so as to allow the fan carrying shaft to be removed from its journal, without disturbing the mounting of the governor 18, the upper sleeve of which, designated by the numeral 19, is provided with a rectangular aperture 20 designed to engage the square portion of the fan-carrying shaft, so as to cause the governor to rotate with the shaft. When the fan carrying shaft is rotated at a high rate of speed, the balls of the governor will be forced outward thereof by the centrifugal force, thereby regulating the speed of the shaft. The arms 18ª to which the balls of the governor are attached, have a sleeve 18ᵇ connected to their lower ends, and which is slidable upon the shaft of the fan. These balls are forced outward by centrifugal force, which causes the arms 18ª, to also swing outward until they contact with the shoe 21ª, of the rod 21, which rod is adjustable by means of a thumb nut 22, as will be readily understood. The rod 21 is provided with a collar 21ᵇ between which, and the casing a spring 21ᶜ is disposed, against the tension of which, the arms 18ª, act. A suitable braking device 21 is provided, and which is spring actuated, and is designed to engage the upper sleeve of the governor; the shaft of the braking device is regulated by a thumb screw 22. The lower end of the fan carrying shaft is conical so to have a needle bearing within a conical shaped recess 23, formed in the end of the bracket 24, bolted or otherwise secured to the side of the cabinet.

It is to be understood that various changes and modifications may be employed in the construction and embodiment thereof, combinations of features, and elements, without in any way departing from the spirit and scope of the invention covered by the claim thereof: it being understood that whatever variations or modifications are employed must fall within the scope of the appended claim.

From the foregoing the essential features, elements and the operation of the device, together with the simplicity thereof, will be clearly apparent, and when manufactured in accordance with the invention, an inexpensive market will be easily obtained therefor.

Having thus described the invention, what is claimed by the protection of Letters-Patent, is:

In a device as set forth, a casing, a spring motor mechanism disposed therein, a fan-carrying shaft operated by said motor mechanism, said casing having a ball bearing for the fan-carrying shaft, comprising upper and lower plates forming boxings secured to the upper and lower faces of the casing, a slidable removable sleeve having a rectangular bore, said fan-carrying shaft being provided with a rectangular portion to fit said bore to cause the two to rotate together, anti-frictional members contained in the boxings, said fan-carrying shaft being composed of two sections so that one section and its fan may be removed without disturbing the other section thereof, said sections of the fan-carrying shaft being disposed continuous in a vertical plane and having their adjacent ends abutting, and a governor mechanism for regulating speed of the fan, as and for the purpose specified.

In testimony whereof I hereunto affix my signature in presence of two witnesses.

JOSHUA H. GALLAND.

Witnesses:
S. P. SMITH, Jr.,
J. L. ROGERS.